(12) United States Patent
Hayafune

(10) Patent No.: US 6,904,382 B2
(45) Date of Patent: Jun. 7, 2005

(54) DIVE COMPUTER, ITS OPERATION METHOD AND A PROGRAM FOR EXECUTING THE OPERATION METHOD WITH A COMPUTER

(75) Inventor: Yukimi Hayafune, Tokyo (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 10/301,426

(22) Filed: Nov. 21, 2002

(65) Prior Publication Data

US 2003/0117898 A1 Jun. 26, 2003

Related U.S. Application Data

(63) Continuation of application No. PCT/JP02/02773, filed on Mar. 22, 2002.

(30) Foreign Application Priority Data

Mar. 22, 2001 (JP) ........................................ 2001-081990

(51) Int. Cl.[7] ........................ G01L 11/00; G01L 13/00; G01L 15/00
(52) U.S. Cl. ..................................................... 702/139
(58) Field of Search ............................. 702/47, 50, 98, 702/138, 139, 189; 73/865.1; 128/201.27, 204.22, 204.23

(56) References Cited

U.S. PATENT DOCUMENTS 5,457,284 A * 10/1995 Ferguson ............... 128/201.27
5,845,235 A * 12/1998 Luukkanen et al. ........ 702/127
5,850,626 A * 12/1998 Kallio ......................... 702/139

FOREIGN PATENT DOCUMENTS

| JP | 5-141972 | 6/1993 |
| JP | 05-141973 | * 6/1993 |
| JP | 5-172572 | 7/1993 |
| JP | 6-54852 | 3/1994 |
| JP | 6-102059 | 4/1994 |
| WO | 02/076820 | * 10/2002 |

OTHER PUBLICATIONS

Translation of 05–141972, Sato, JPO, all pages, Jun. 1993.*

* cited by examiner

Primary Examiner—Michael Nghiem
(74) Attorney, Agent, or Firm—Greer, Burns & Crain, LTD

(57) ABSTRACT

A dive computer provides not only a digital, but also a graphic display of depth for a safety stop and a decompression stop, thereby providing a safe diving watch enabling prompting of a diver for simple maintenance of depth. The dive computer includes a timekeeping section for keeping the diving time, a measuring section for measuring diving information, a calculating section for processing diving information obtained from the measuring section, and a display for displaying diving information obtained from the calculating section. The display minimally has a first function display for displaying the current depth of the diver and a second function display for graphically displaying information giving an instruction for safety operations.

16 Claims, 9 Drawing Sheets

FIG. 3
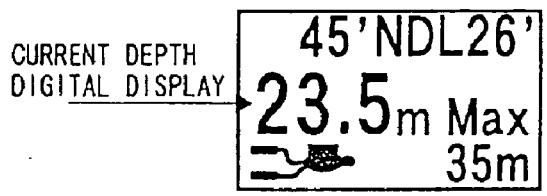
(A) SCUBA DIVING DEPTH DISPLAY
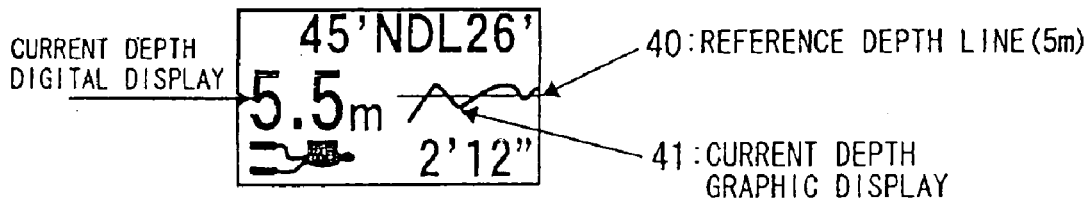
(B) SAFETY STOP GRAPHIC DISPLAY
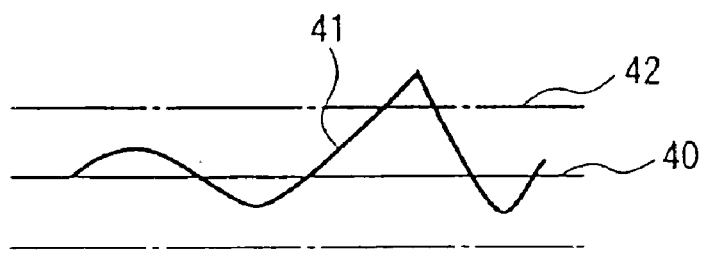
(C)

FIG. 4
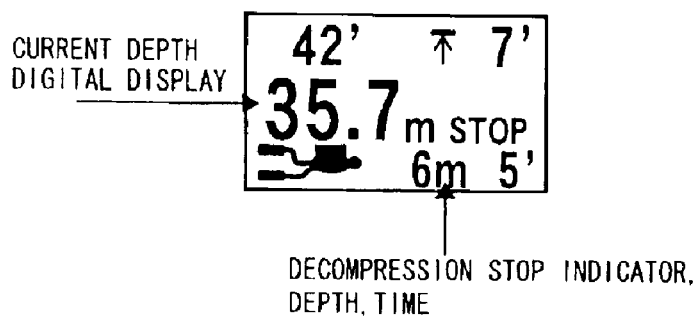
(A) ST INDICATION DISPLAY
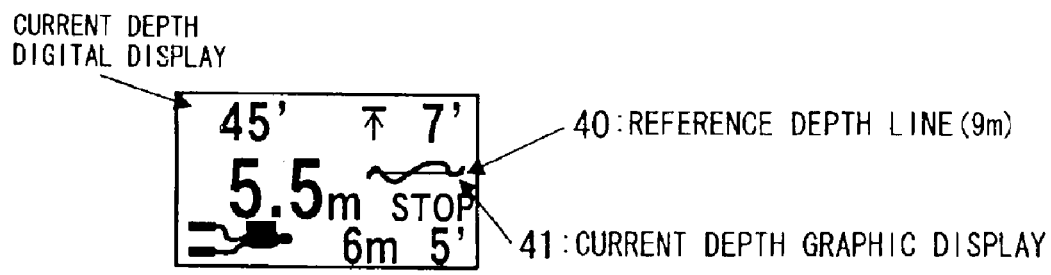
(B) DECOMPRESSION STOP GRAPHIC DISPLAY
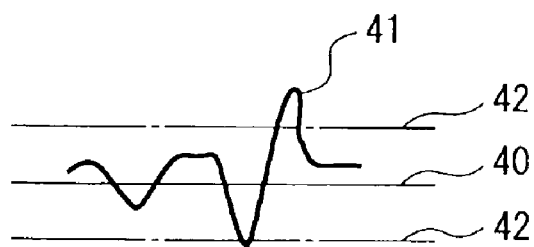
(C)

DIVE COMPUTER, ITS OPERATION METHOD AND A PROGRAM FOR EXECUTING THE OPERATION METHOD WITH A COMPUTER

This is a continuation of International PCT Application No. PCTJP02/02773, filed Mar. 22, 2002.

BACKGROUND OF THE INVENTION

1. Field of the Invention

The present invention relates to a diving watch, particularly to watch capable of measurement and recording of diving data such as time, depth, and water temperature, and more particularly to a dive computer capable of making a graphical display of safety stop information or decompression stop information.

2. Background Art

Over the past 20 years of widespread growth of diving, technological development has progressed in the area of scuba diving and skin diving watches (diver's watches) capable of measuring and visually displaying depth, diving time, and water temperature and the like during a dive. In addition, starting about 10 years ago there has been rapid growth in dive computers which continuously monitor the body's nitrogen level which is become problem in scuba diving and calculate and display important data such as how much remaining time a diver has for a dive. An example of a dive computer, as in, for example, Japanese unexamined patent publication (KOKAI) No. H5-141973, enables determination of the proportion with respect to the safe allowable limit amount of inert gases in body tissues when resurfacing, following the algorithm shown in FIG. 9, which illustrates the case of Japanese unexamined patent publication (KOKAI) No. H5-141973 described below.

When a dive is begun (step S4), the water pressure is detected and the water depth is calculated (steps S6 and S7), the nitrogen partial pressure in the body being calculated based on the calculated water depth (step S8). The ratio of this internal body nitrogen partial pressure to a limitation of the safe allowable amount of internal body nitrogen partial pressure stored in ROM is calculated (step S9) and, if the internal body nitrogen partial pressure is less than the safe allowable limit amount, the amount of no-decompression diving time is calculated (steps S10 and S11), and the ratio of the internal body nitrogen partial pressure to the safe allowable limit amount is displayed along with the water depth and the like (step S12). At step S10, if the internal body nitrogen partial pressure exceeds the safe allowable limit value, the decompression stop water depth and decompression stop time are calculated and displayed, together with the ratio of the internal body nitrogen partial pressure to the safe allowable limit amount thereof (steps S13 to S15).

In the water, although a diver determines the water depth for diving in accordance with the value calculated by a dive computer such as in the Japanese unexamined patent publication (KOKAI) No. H5-141973, because nitrogen is accumulated in the body within the computer indicated range, in order to release this nitrogen it is recommended that when surfacing a safety stop be made at a given depth for a given amount of time. When transitioning to decompression diving during a dive, it is necessary to release the nitrogen by stopping for a given time at a given depth indicated by the computer. In the past, when it is necessary in this manner to stop in the water for a given amount of time at a given water depth, this was done by looking at the digital depth display of the computer.

With the present invention, the depth displays for both safety stops and depth for decompression stops are not only displayed digitally but also indicated graphically, thereby making it easier to prompt the diver to maintain the depth.

The present invention provides a safe diving watch that provides a simple prompt to the diver to maintain the depth.

DISCLOSURE OF THE INVENTION

In order to solve the problem encountered in the past, when a dive computer according to the present invention measures a prescribed depth in the water, the display thereof is switched automatically so as to display a depth graph.

By displaying the depth at which a diver must stop for a prescribed time, graphically, it is easy to maintain the depth, and possible to prompt the diver to stop at that depth.

Thus, the basic technical constitution adopted by an aspect of a dive computer according to the present invention is as described below.

Specifically, the dive computer minimally has a timekeeping means for keeping the diving time, a measuring means for measuring diving information, a calculating means for processing diving information obtained from the measuring means, and a displaying means for displaying diving information obtained from the calculating means, wherein the display means minimally has a first display function for displaying the current depth of the diver and a second display function for graphically displaying information giving an instruction for a safety operation.

BRIEF DESCRIPTION OF THE DRAWINGS

FIG. 3(A) shows an example of a scuba diving depth display, and FIG. 3(B) is an example of a safety stop graphic display and FIG. 3(C) is an example of a graphic display of a water depth in the present invention.

FIG. 4(A) shows an example of a decompression stop indication display, and FIG. 4(B) shows an example of a decompression stop graphic display and FIG. 4(C) is an example of a graphic display of a water depth in the present invention.

BEST MODE FOR PRACTICING THE PRESENT INVENTION

The specific configuration of a dive computer according to the present invention is described below in detail, with reference to drawings.

Figure 1:
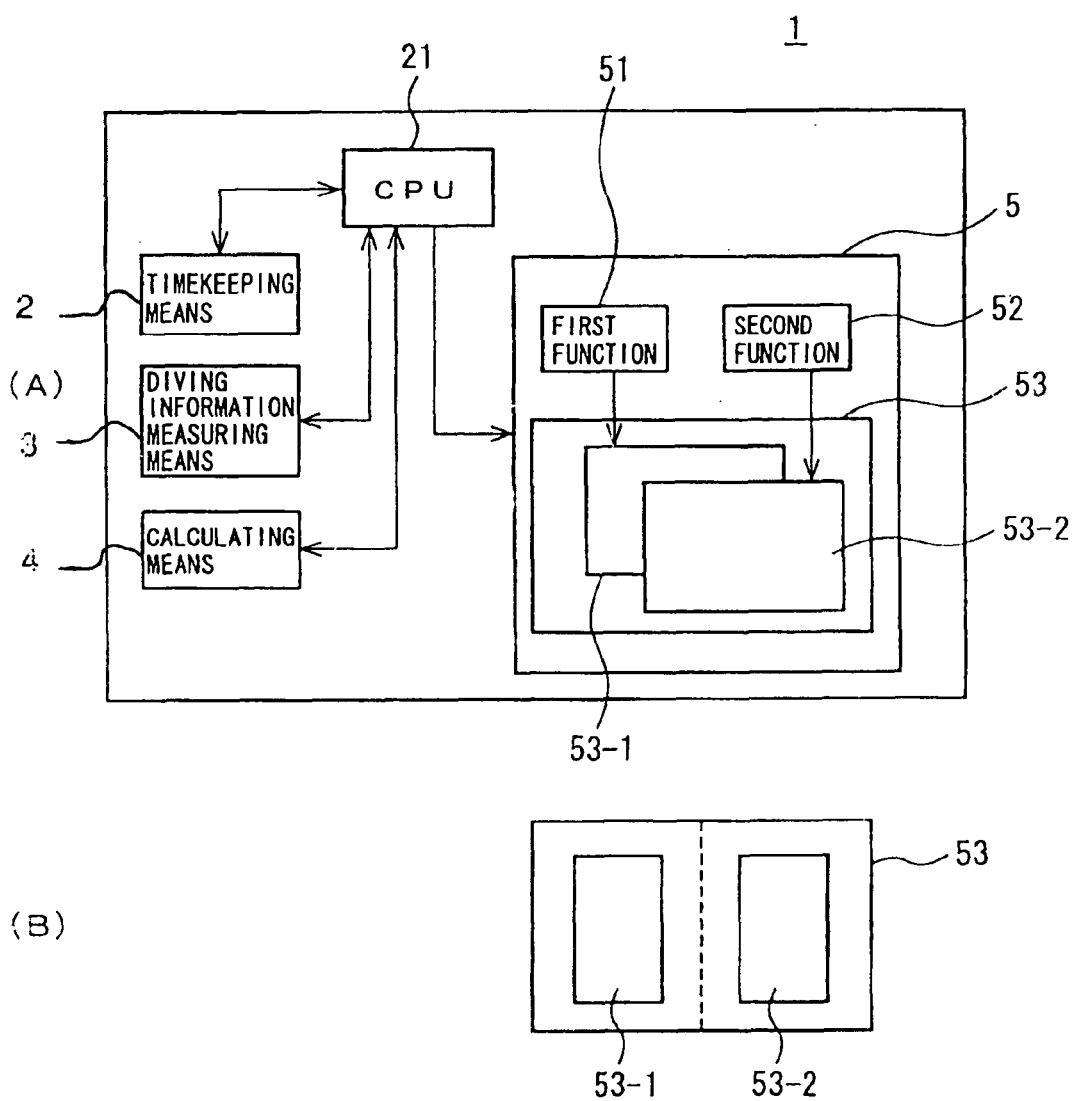
FIG. 1(A) is a block diagram illustrating the configuration of an example of a dive computer and FIG. 1(B) is one example of its display area according to the present invention.

Specifically, FIG. 1 is a drawing showing the configuration of an example of a dive computer according to the present invention, this being a dive computer 1 minimally having a timekeeping means 2 for timekeeping the diving time, a diving information measuring means 3 for measuring diving information, a processing means 4 for processing diving information obtained from the timekeeping means 2 or the diving information measuring means 3, a display means 5 for displaying diving information obtained by the processing means 4, and a central processing control means (CPU) 21 for performing overall management and control of the operation of the above-noted means, wherein the display means 5 minimally has a first display function (referred to a first function hereafter) 51 for displaying a diver's current depth, and a second display function (referred to a second function hereafter) 52 for graphically displaying information giving an instruction for a safety operation.

It is preferable that the display means 5 of the present invention has a prescribed display region 53 for either displaying simultaneously the information related to the first function 51 and the information related to the second function 52, or selectively displaying these separately.

Additionally, in the present invention the display region 53, as shown in FIG. 1(A), can be configured so that it selectively displays singly either a first region 53-1 which can display the information related to the first function 51 or a second region 53-2 which can display the information related to the second function 52, or can alternatively be configured as shown in FIG. 1(B), so that it has a divided display formed by a first display region 53-1 that displays information related to the first function 51 and a second display region 53-2 that displays information related to the second function 52.

It is desirable that the information displaying the safety operation in the present invention be either safety stop information or decompression stop information, and it is desirable that the first function 51 digitally displays, for example, in addition to the current diver depth information, at least one of the diving time, the no-decompression limit time, the maximum diving depth, the current time or the like, and that the second function 52 be a function that displays, for example, either safety stop information or decompression stop information.

In a dive computer 1 according to the present invention, the second function display means corresponding to the second [display] region 53-2 serving as the display means that displays information of the second function 52 in the display means 5 be configured so as to be active in a scuba diving mode.

The term of safety stop as used here refers to a stopping at a shallow depth for a given amount of time at the end of a dive during no-decompression diving for the purpose of releasing inert gas such as nitrogen that has accumulated within the body.

The depth for this is usually 5 meters. During a safety stop if there is a nearby rocky area or sandy area, it is possible to enjoy the surrounding view and fish. In an ocean in which absolutely nothing is visible, it is monotonous for a diver to just wait for the time to elapse while also maintaining depth.

Normally, a stop is made at 5 meters for 3 minutes.

In a decompression dive, when the diver is to reach the water surface, the diver must stop for a given amount of time at a given depth. This is what is refereed to as a decompression stop.

The decompression stop depth is determined by a residual inert gas calculation algorithm, in accordance with the nature of the dive and, for example, with a DCIEM algorithm this is determined to be 3 meters as a starting point, with another stop depths being determined each 3 meters, thereafter.

Thus, by graphically displaying information regarding the above-noted safety operations, it is possible for a diver to perform adjustment of his or her depth while viewing a graph during the monotonous time period, making it possible to pass the time pleasantly.

Figure 2:
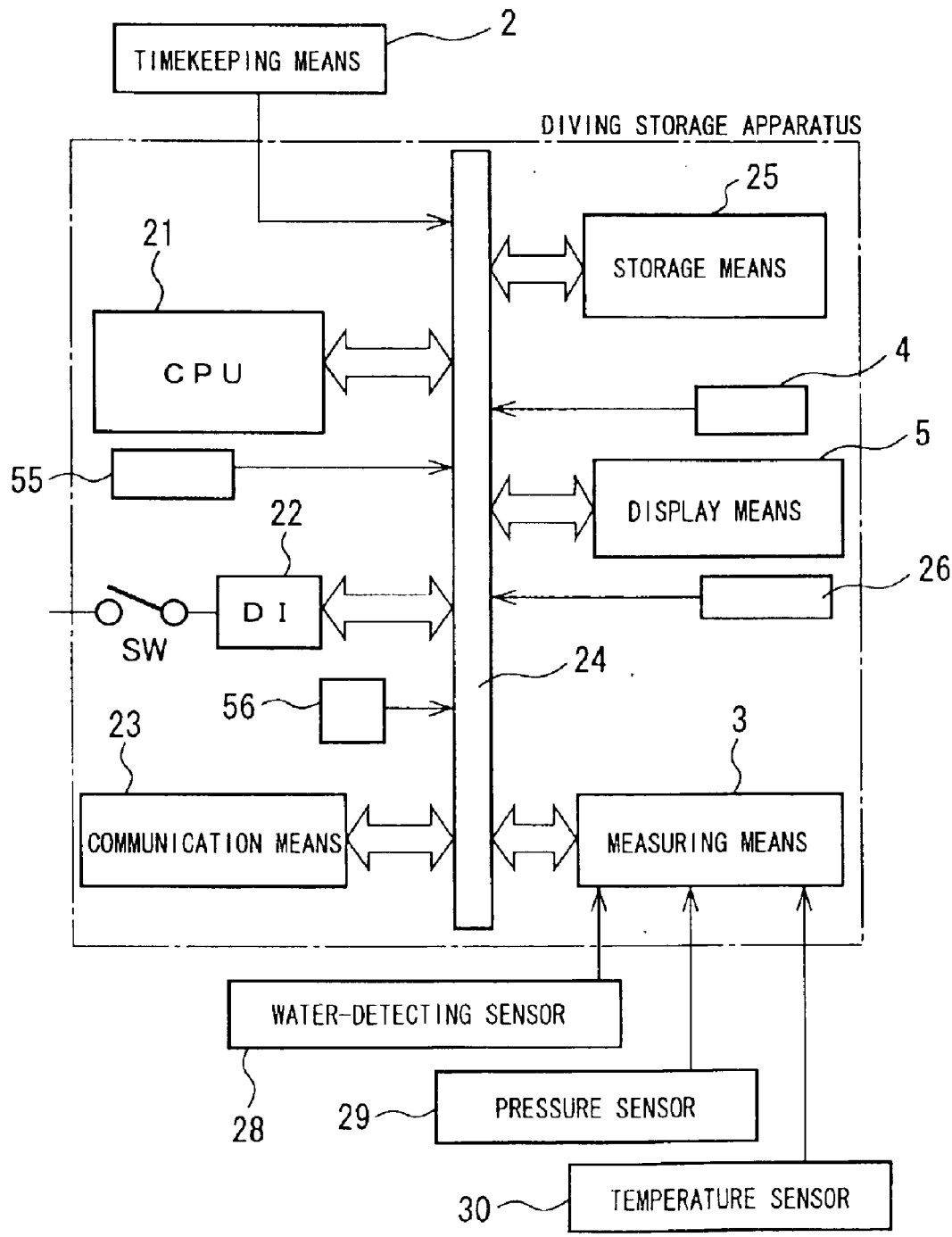
FIG. 2 is a drawing showing an example of a circuit block diagram illustrating a dive computer according to the present invention.

A specific example of a dive computer according to the present invention is described making reference to the system block diagram of FIG. 2.

The dive computer according to the present invention is made up of, mutually connected via a bus 24, a timekeeping means 2, a storage means 25, an LCD panel serving as the display means 5 and an LCD controller 26 controlling the LCD panel, a measuring means 3 for inputting diving information, a processing means 4 that calculates prescribed information from various information, a digital input (DI) 22 serving as an input means for externally selecting a function or the like, a communication means 23 for performing communication with an external computer or the like, and a CPU (central processing unit) 21 that performs overall management and control of the operation of the above-noted means, each being mutually connected to each other via a bus 24.

It is further desirable to provide, connected to the bus 24, an inert gas partial pressure calculation means 55, which calculates the partial pressure of the inert gas accumulated within the body, and an inert gas partial pressure comparison means 56, which performs a comparison of the inert gas partial pressure value calculated by the inert gas partial pressure value calculation means 55 with a reference inert gas partial pressure value stored in the storage means 25, both being connected to the bus 24.

The timekeeping means 2 in the present invention is made up of an oscillator circuit, a frequency divider circuit, and a counting circuit or the like, a clock signal of a fixed frequency generated by the oscillator circuit being frequency divided by the frequency divider circuit so as to generate a reference clock signal for the watch. The counting circuit keeps time, such as the current time or the elapsed time from the start of a dive, by the reference clock signal that is input from the frequency divider circuit and outputs the time to CPU 21.

The storage means 25 in the present invention is formed by a ROM (read only memory) in which a program is stored, a working area, a RAM (random access memory) in which is stored recorded diving data, and a flash ROM and the like.

The measuring means 3 is externally connected therewith a water-detecting sensor 28, a pressure sensor 29, a water temperature sensor 30, and the like, and when the water-detecting sensor 28 detects water, the CPU 21 requests the pressure sensor 29 to input pressure data. The CPU 21 receives the pressure data via the bus 24, and converts it to depth, and displays the result on the display means 5. Water depth data during a dive is stored in a flash ROM or the like, which serves as the storage means 25, each prescribed time interval.

In the present invention, after a prescribed amount of time has elapsed after the water-detecting sensor 28 detects water, the CPU 21 requests the water temperature sensor 30 to input water temperature data. The calculation means 4 receives water temperature data via the bus 24 and performs conversion thereof to a temperature, the result being displayed on the display means 5. Water temperature data during a dive is stored in a flash ROM or the like, which serves as the storage means 25, each prescribed time interval.

Water depth and water temperature data that is stored in a storage means 25 such as a flash ROM during a dive can be accessed after the dive as log data. When a signal from the digital input (DI) 22 indicates display of log data, the CPU 21 reads prescribed water depth and water temperature data or the like from the storage means 25 and displays this data on the display means 5. When data stored in the storage means 25 is to read out from an externally connected personal computer or the like, the communication means 23 is used.

Next, the function of the dive computer according to the present invention is described below, with reference to FIG. 2.

Because the ROM of the storage means 25 has priorly stored therein the safe allowable limit amount of inert gas partial pressure within bodily tissue at a time of resurfacing, which is compared with the inert gas partial pressure within bodily tissue calculated at the time of diving, it serves also as a means to store the safe limit allowable amount.

The calculation means 4 performs a calculation of the amount of inert gas partial pressure within bodily tissue with a prescribed time interval from the depth and diving time data during the diving.

And then, the calculation means 4 compares the calculated partial pressure with the safe limit allowable amount priorly stored in the storage means 25 storing safe limit allowable amount and, if the calculation result is within the allowable range, the calculation means 4 further calculates the no-decompression time limit.

The calculated no-decompression limit time is displayed as appropriate on the display means 5. In the case in which the calculation result is outside the allowable range, the calculation means 4 calculates the decompression stop depth and time and displays these on the display means 5.

The function of automatically graphically displaying the depth is described next. Based on the management and control by the CPU 21, the calculation means 4 performs a comparison between the calculated partial pressure and the priorly stored safe allowable limit amount stored in the storage means 25 and further, the partial pressure as resulted by this calculation is existed within the allowable range and if the depth converted from the pressure data obtained from the pressure sensor 29 by the calculation means 4 is within a safety stop graph display range, the CPU 21 performs a display of a safety stop graph on the display means 5.

When the CPU 4 performs a comparison between the calculated partial pressure and the priorly stored safe allowable limit amount stored in the storage means 25, and if the calculation result is outside the allowable range and also the depth converted from the pressure data obtained from the pressure sensor 29 by the calculation means 4 is within the decompression stop graph display range, the CPU 21 performs a display of the decompression stop depth on the display means 5.

Next, the basic operation of the dive computer 1 of the present invention is described below, with reference being made to FIG. 3 and FIG. 4.

Essentially, in a dive computer 1 according to the present invention, when the water-detecting sensor 28 is switched on, depth measurement is started by calculation from the information of the pressure sensor 29. When the depth (t) reaches 1 meter or greater and also more than 3 minutes have elapsed, the scuba diving mode is enabled, and calculation of a no-decompression time limit begins. The safety stop and decompression stop is each type of stops, made when resurfacing from a scuba dive, and are described individually below.

(Safety Stop Graph Display)

When the depth of a scuba dive exceeds 5 meters, it becomes possible to make a safety stop display.

In the condition in which it is possible to make a safety stop display, when the depth of 5 meters is detected, the safety stop display condition is enabled, and the graphic display thereof is started. FIG. 3(B) shows an example of a safety stop graphic display. For the sake of comparison, FIG. 3(A) shows an example of a scuba diving depth display. In the safety stop display condition, during the depth condition (t), 3 m<t<7 m, the graph is constantly displayed. When the depth exceeds 7 meters, the safety stop graph display is stopped, while remaining in the safety stop graphic display enabled condition, and the scuba diving depth display condition is enabled. If the depth becomes shallower than 3 meters, the safety stop display enabled condition is cancelled and the scuba diving depth display condition is enabled. In order to transition into the safety stop display enabled condition, it is necessary to increase the depth to 5 meters or greater so that the condition is enabled in which the safety stop display is enabled. The illustrated current depth graph display can be a bar graph type display.

If a depth of less than 1 meter is detected and more than 10 minutes have elapsed, the scuba diving mode is terminated.

FIG. 3(C) is the same as FIG. 4(C) which will be explained later.

(Decompression Stop Graph Display)

During decompression diving, if the current depth is greater than the instructed decompression depth, the decompression stop graph display condition is enabled. In the decompression stop graph display enabled condition when the instructed decompression depth is detected, the decompression stop graph display is enabled and the graphic display is started. In the decompression stop graphic display enabled condition, in the range satisfying (decompression stop depth+1 meter)>t>(decompression stop depth−1 meter), the graphic display is made continuously.

When the current depth (t) exceeds (the decompression stop depth+1 meter) the decompression stop instruction display condition is enabled while maintaining the decompression stop graphic display enabled condition.

When the current depth (t) is below (the decompression stop instructed depth−1 meter), the decompression stop graphic display enabled condition is cancelled, and the decompression instruction display condition is enabled.

In order to start the decompression stop graphic display again, it is necessary to detect a depth that is greater than the decompression stop instructed depth and go into the decompression stop graphic display enabled condition. FIG. 4(B) shows an example of a decompression stop graphic display. As a comparison, FIG. 4(A) shows an example of a decompression stop instruction display.

The display means for displaying graphs 5, used in the dive computer 1 according to the present invention is configured so as to perform a decompression stop graphic display of a stop depth calculated by the calculation means 4 on the second region 53-2, for an information regarding a safety operation, which is the second function 52 of display means 5, displaying the reference line 40 for the decompression stop graph, and also so as to display as a graphic display 41 the current and past diving depth information of the diver as a continuous solid line, dotted line, dot display, or bar graph or the like in time sequence with respect to the reference line 40.

Additionally, as another specific example in the present invention, it is possible to adopt a configuration in which for example, as shown in FIG. 4(C) an allowable line 42 can be displayed at least on one side of this reference line 40 and being parallel therewith with interposing a prescribed distance therebetween, and further possible to adopt a configuration in which the allowable line 42 is displayed with a different color from the reference line 40.

It is further possible to adopt a configuration in which, in the case in which a diver's past and current depth exceeds an allowable range between the reference line 40 and at least one allowable line 42, the graphic line 41 is displayed with a color different from the normal graphic display.

In the present invention, the stop depth refers to either one of the safety stop depth and the decompression stop depth, and after the display means for displaying graphs 5 displayed the scuba diving depth, it makes a comparison between the current depth and a prescribed depth and, if a safety stop is required, the display means for displaying graphs 5 is set to the safety stop graphic display mode.

In the present invention after the display means for displaying graphs 5 displays the scuba diving depth, it performs a comparison between the current depth and a prescribe depth and, in the case in which a decompression stop is necessary, the display means for displaying graphs 5 is set to the decompression stop graphic display mode.

Additionally, a preferred embodiment of the present invention can be configured such that, in the case in which the display means 5 is in the safety stop graphic display mode, a graph showing the diver's current and past depths, including the reference line 40 is displayed by the display means for displaying graphs 5 and simultaneously therewith at least one information selected from the current diver's depth information, dive time information, no-decompression time limit information, and information about how long the diver must stay at the safety stop depth is digitally displayed.

As the same way as mentioned above, a separate preferred embodiment of the present invention can also be configured such that, in the case in which the display means 5 is in the decompression safety stop graphic display mode, a graph showing the diver's current and past depths, including the reference line 40 is displayed by the display means for displaying graphs 5 and simultaneously therewith at least one information selected from the current diver's depth information, dive time information, no-decompression stop depth information and information about how long the diver must stay at the no-decompression stop depth is digitally displayed.

Figure 5:
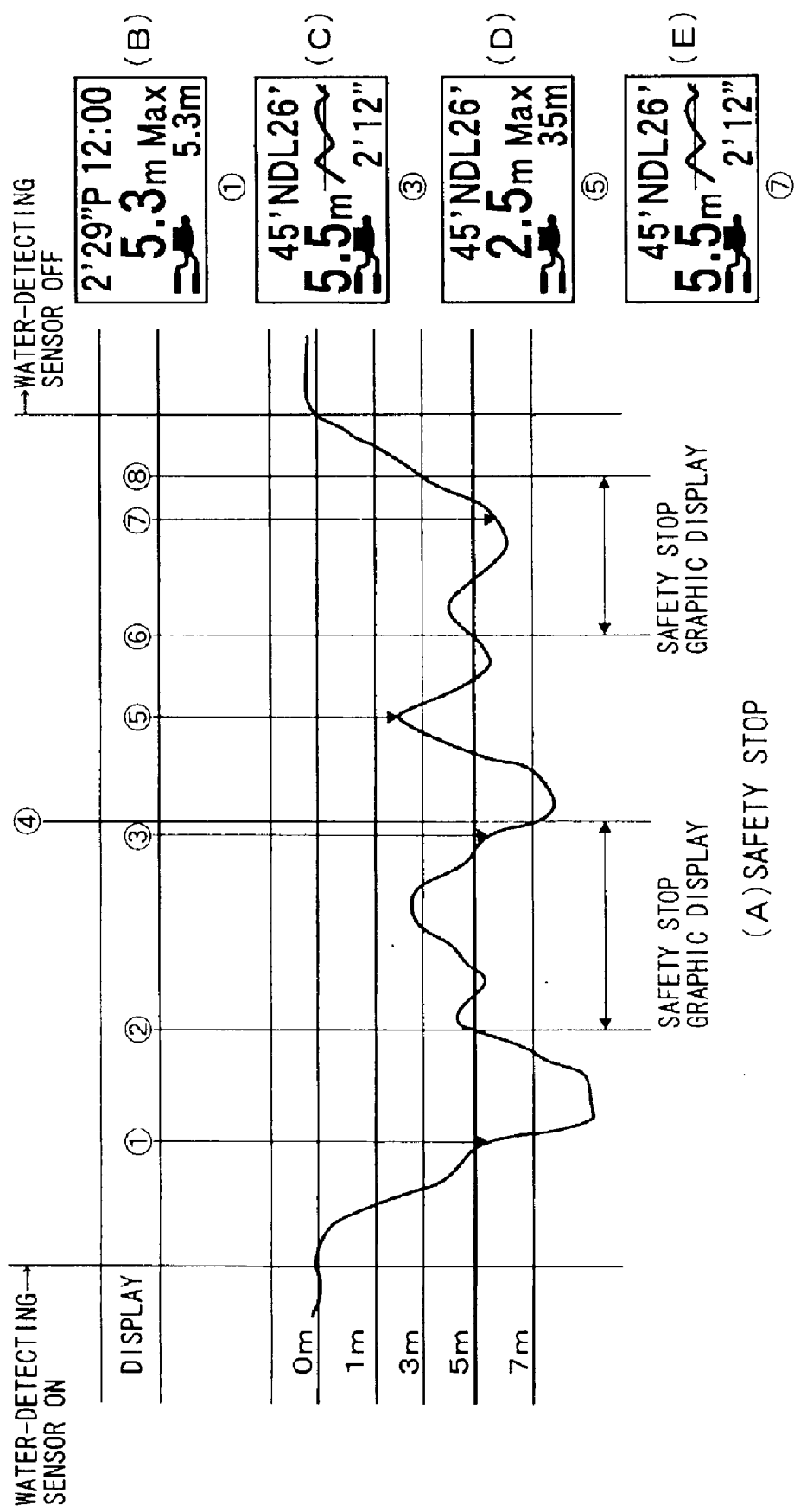
FIG. 5 is a drawing illustrating an example of a method for making a graphic decompression stop display in the present invention.

FIG. 5 is a drawing showing an example of a dive profile during no-decompression scuba diving, an example of a safety stop graphic display in the present invention being illustrated by this drawing.

In FIG. 5(A), the point <1> shows the condition in which scuba diving has begun and the depth of 5 meters is first reached, the condition of the display means 5 at this point being as shown in FIG. 5(B), at which stage only the scuba diving depth display is made, there being no graphic display.

Next, after the diver reaches or exceeds a depth of 7 meters, the diver rises to a depth of 5 meters, at the stage <2>, at which the safety stop graphic display starts.

For example, the safety stop graphic display at the point in time <3> during the safety stop graphic display appears as shown in FIG. 5(C).

After the above, at the point in time <4> the safety stop graphic display is stopped, and at the point in time <5> when the diver's depth is below the range of 3 meters, the condition of the graphic display of the graphic display means at this point in time, appears as shown in FIG. 5(D). In this case, that is, all that is presented is a scuba diving depth display.

After the above, after the diver's diving depth is detected as being 3 meters or shallower, once when the depth is detected as being 5 meters or greater, the safety stop display enabled condition occurs again and thereafter, at time <6>, when the depth of 5 meters is again detected, the safety stop graphic display is started, after which when about 3 minutes have elapsed at time <7> the display condition of the display means 5 appears as shown in FIG. 5(E).

After the above, at time <8> the safety stop graphic display is stopped.

Figure 6:
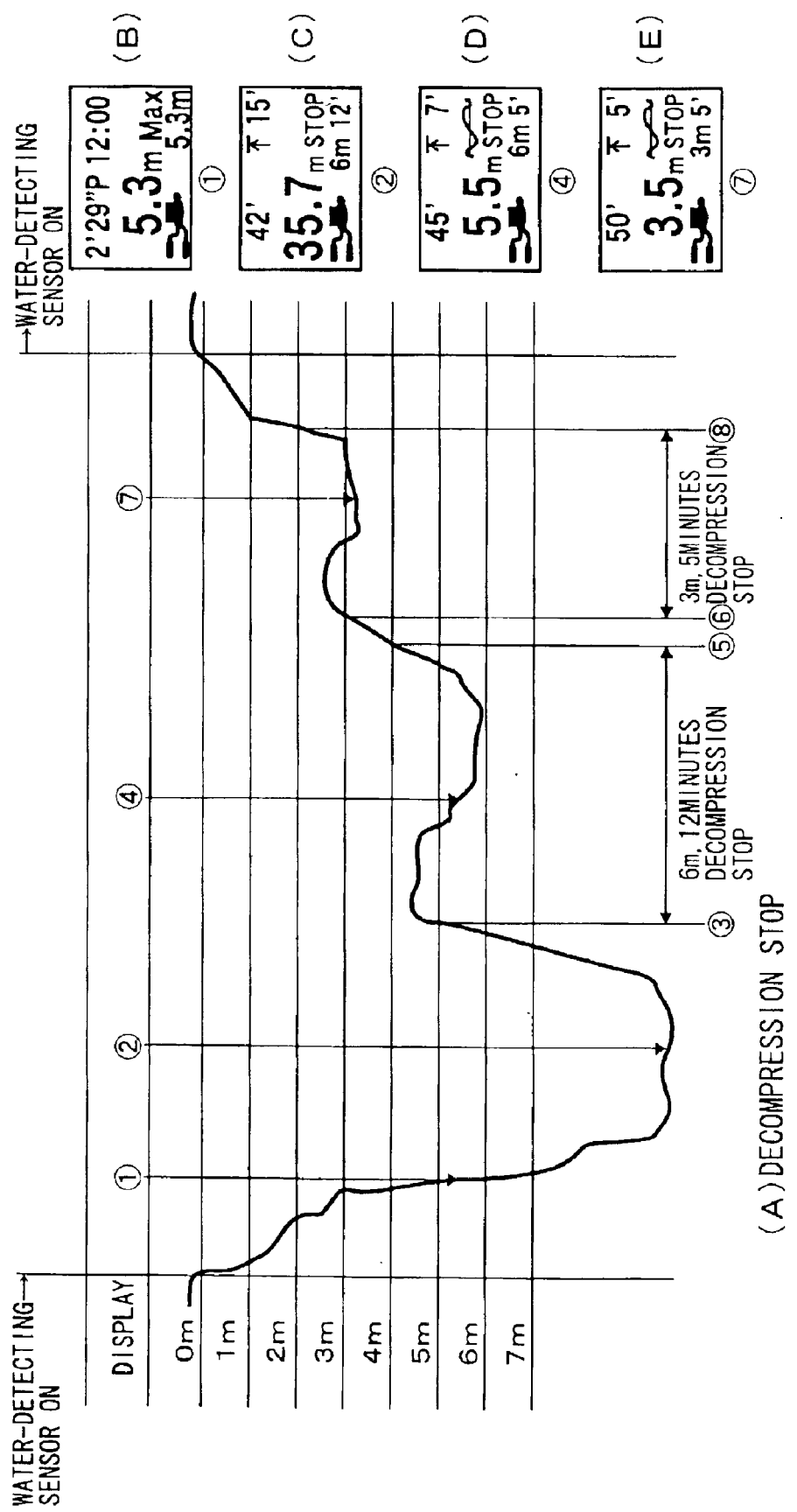
FIG. 6 is a drawing showing an example of a decompression stop graphic display in the present invention.

FIG. 6 shows an example of a dive profile during scuba diving decompression, and illustrates the decompression stop graphic display.

In this drawing, FIG. 6(B) to FIG. 6(E) show the screen displays of the display means for displaying graphs 5 at the depths at the points in time <1>, <2>, <4>, and <7>, in the dive profile as shown in FIG. 6(A).

That is, for the time <1>, FIG. 6(B) shows the condition of the display of the display means for displaying graphs 5 for the case in which the depth is 5.3 meters after 2 minutes and 29 seconds have elapsed after the start of the dive.

In this case, all that is presented is a scuba diving depth display.

After the above, at the time <2>, the decompression stop instruction display for decompression diving is made, the condition of the display of the display means for displaying graphs 5 at this point being as shown in FIG. 6(C).

Next, at the time <3> because the diver has risen to a depth of 5 meters, a decompression stop (6 meters, 12 minutes) is started, and the condition of the display of the display means for displaying graphs 5 at time <4> while the decompression stop is being performed is as shown in FIG. 6(D).

After the above, at time <5> the decompression stop is once interrupted and at time <6> the second decompression stop (3 meters, 5 minutes) is started, the condition of the display of the display means for displaying graphs 5 at the time <7> being as shown in FIG. 6(E).

After the above, at time <8> the decompression stop graphic display is stopped.

Figure 7:
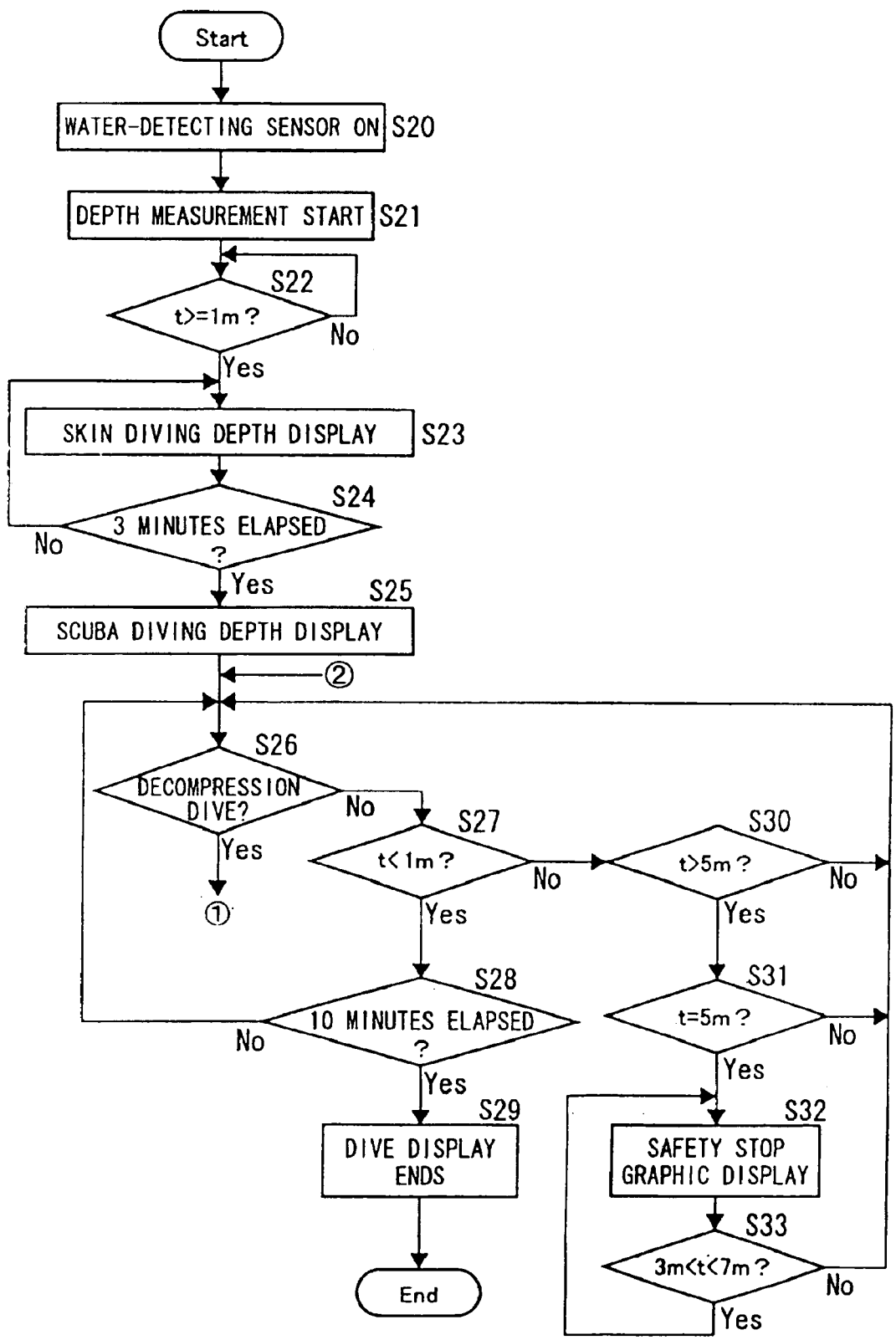
FIG. 7 is a flowchart illustrating an example of the procedure of an operating method for a dive computer according to the present invention.
Figure 8:
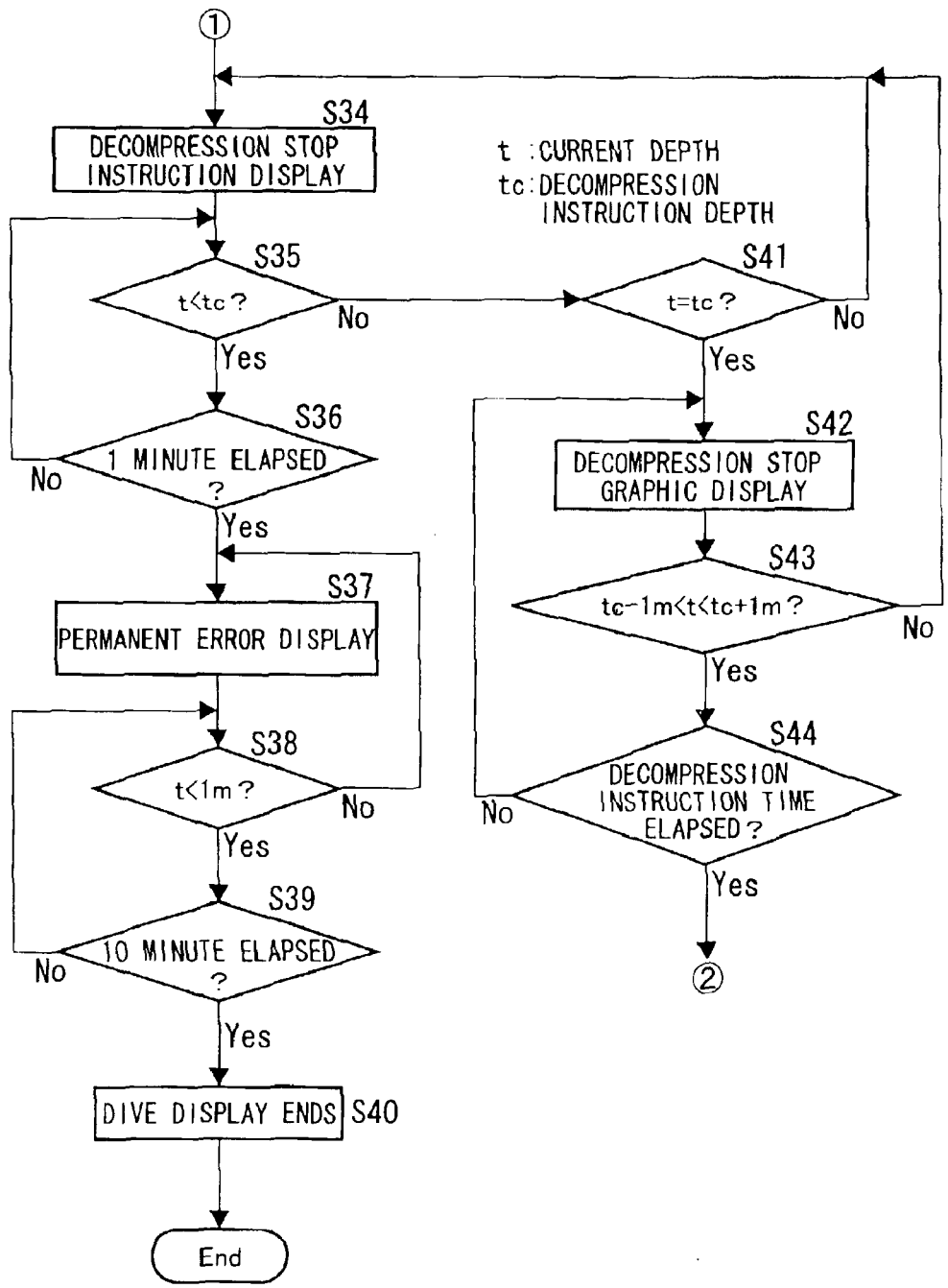
FIG. 8 is a flowchart that is the continuation of the flowchart that starts with FIG. 7.
Figure 9:
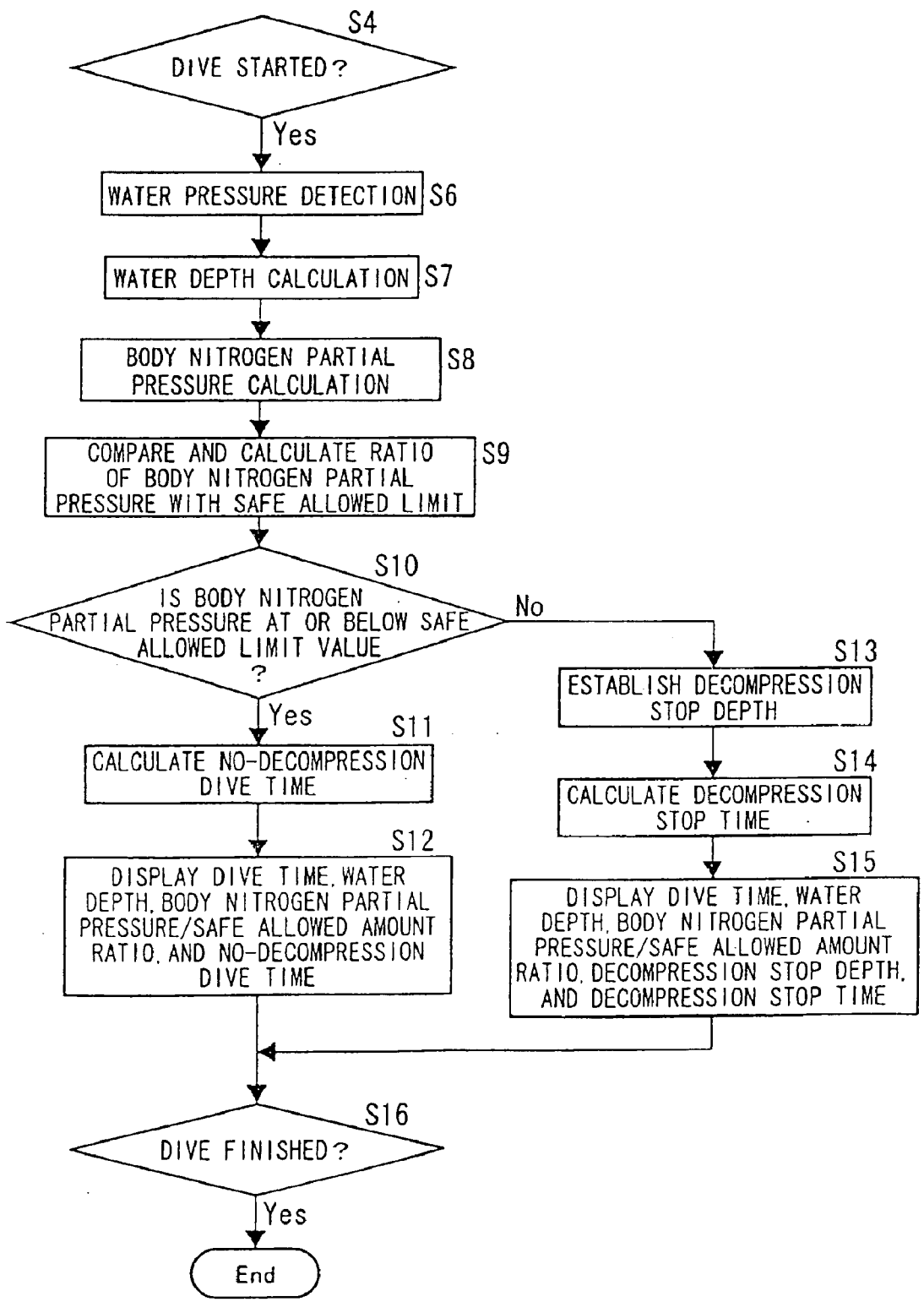
FIG. 9 is a drawing illustrating an example of a dive computer of the past.

An example of the operating procedure of a dive computer 1 according to the present invention is described below, with reference made to the flowcharts of FIG. 7 and FIG. 8.

Specifically, a method of operating a dive computer according to the present invention is a method in a dive computer generally having at least a timekeeping means for keeping the dive time, a measuring means for measuring diving information, a calculating means for processing diving information obtained from the measuring means, and a displaying means for displaying diving information obtained from the processing means, this method comprising:

a step of displaying skin diving depth from the depth information, a step of displaying scuba diving depth from the time information after the display of the skin diving depth, a step of making a judgment as to whether or not it is a decompression dive condition based on a priorly established dive time information and dive depth information after displaying the scuba diving depth, a step of, in the case in which it is not a decompression dive condition, making a judgment as to whether or not the current diver's diving depth is a priorly established depth value, a step of, in the case in which the current diver's depth exceeds the priorly established depth value, a safety stop graph indicating safety stop information using as a reference line corresponding to a prescribed depth value in one region of the display means in order to indicate safety stop information, a step of performing a judgment after the safety stop graph is displayed of whether or not the diver's current depth information is within a prescribed allowable depth range with respect to the reference line and, in the case in which the diver is within the allowed range, continuing the safety stop graph display, but if the diver is not within the allowable range, returning to the step that performs a judgment as to whether or not the diver's dive is a decompression dive, a step of, in the case in which the step of judging whether or not it is a decompression dive, the judgment was that the dive is a decompression dive condition, displaying a decompression stop instruction display, a step of, in the case in which the diver's current dive depth is a priorly established decompression depth value, displaying on a part of the display means a decompression stop graph indicating decompression stop information using as a reference line based upon a prescribed decompression depth value, so as to display the decompression information, a step of comparing the diver's current depth with a priorly established decompression instruction depth, a step of, after display of the decompression stop graph, making a judgment as to whether or not the current diver's depth information is within a depth range indicated as a priorly established allowable depth range with respect to the reference line, a step of, in the case in which the diver is within the allowable range, making a judgment as to whether or not the decompression instruction time has elapsed, and a step of, in the case in which the diver's dive time has passed the decompression instruction time, making a judgment as to whether or not the diver's dive is a decompression dive.

The method of operation of the dive computer 1 according to the present invention is described below in further detail, with reference being made to FIG. 7 and FIG. 8.

Specifically, after the start, at step S20 when the water-detecting sensor 28 is switched to the on condition, at step S21 measurement of depth starts and at step S22 a judgment is made as to whether or not the depth t is 1 meter or greater (or deeper). If the result of this judgment is no, return is made to step S22 and the above step is repeated. If the result is yes, processing proceeds to step S23, at which skin diving depth display is started.

After the above, processing proceeds to step S24 and a judgment is made as to whether or not 3 minutes have elapsed since the start of the dive. If the result is no, return is made to step S23, the above-noted step being repeated. If the result is yes, processing proceeds to step S25, at which the scuba diving depth display starts.

After the above, processing proceeds to step S26, at which a judgment is made as to whether or not the current diver's dive information indicates a decompression dive. If the result is yes, processing proceeds to step S34, at which a decompression stop instruction display is performed. If the result is no, however, processing proceeds to step S27, at which a judgment is made as to whether or not the diver's current dive depth (t) is less than 1 meter. If the result of this judgment is yes, processing proceeds to step S28, at which a judgment is made as to whether or not 10 minutes has passed since the current depth leached less than 1 m.

If the result is no, return is made to step S26, from which the above-noted each one of the steps is repeated. If the result of the judgement at the step 28 is Yes, processing proceeds to step S29, and the diving display is ended.

If at step S27 the result of the judgment is no, processing proceeds to step S30, at which a judgment is made as to whether or not the current diver's dive depth (t) exceeds 5 meters. If the result of this is no, return is made to step S26, from which the above-noted steps are repeated. If the result at step S30 is yes, processing proceeds to step S31 at which a judgment is made as to whether or not the current diver's dive depth (t) equals to 5 meters.

If the result at the step S31 is no, return is made to step S26, the above-noted steps being repeated. If, however, the result at step S31 is yes, at step S32 the safety stop graph display is performed.

After the above, at step S33 a judgment is made as to whether or not the diver's current dive depth t is within a priorly established allowable range.

For example, the allowable range can be between 3 meters and 7 meters relative to the diver's current depth (t), so that the judgment is made as to whether the depth is in the range 3 meters<t<7 meters. If the result is no, return is made to step S26, from which the above-noted steps are repeated, and if the result is yes, return is made to step S32 and the above-noted steps are repeated.

At step S34, after execution of the safety stop instruction display, processing proceeds to step S35, at which a comparison is made between the current depth t and the decompression instruction depth tc and, if t<tc, processing proceeds to step S36, at which a judgment is made as to whether or not 1 minute has elapsed.

If the result at step S36 is no, return is made to step S35, from which the above-noted steps are repeated.

If the result at step S36 is yes, a permanent error display (S37) is made, after which processing proceeds to step S38, at which a judgment is made as to whether or not the diver's current depth (t) is less than 1 meter. If the result is no, return is made to step S37 and the above-noted step is repeated, but if the result is yes, processing proceeds to step S39, at which a judgment is made as to whether or not 10 minutes have elapsed after detecting that the diver's depth is less than 1 meter. If the result of this is no, return is made to step S38 the above-noted step is repeated, and if the result is yes, processing proceeds to step S40 and the diving display operation is stopped and this routine is ended.

If the result at step S35 is no, however, processing proceeds to step S41, at which a judgment is made as to whether or not the current diver's dive depth t coincides with the decompression instruction depth tc. If the result of this is no, return is made to step S34 and the above-noted steps are repeated. If the result is yes, however, processing proceeds to step S42, at which the decompression stop graph display is performed.

Next, processing proceeds to step S43, at which a judgment is made as to whether or not the diver's current dive depth t is within a priorly, established allowable range.

For example, the allowable range can be set so that the current diver's depth t should be fallen within a range of the decompression instruction depth tc±1 meter and thus, the judgment is made as to whether or not the condition is (tc−1 meter)<t<(tc+1 meter). If the result is no, return is made to step S34, from which the above-noted steps are repeated. If the result at step S34 is yes, however, processing proceeds to step S44, at which a judgment is made as to whether or not the decompression instruction time has elapsed. If the result of this is no, return is made to step S42 and the above-noted step is repeated, but if the result is yes return is made to step S26, from which the above-noted steps are repeated.

Another aspect of the present invention is a computer program executing a method in a dive computer generally having a timekeeping means for keeping the dive time, a measuring means for measuring diving information, a calculating means for processing diving information obtained from the measuring means, and a displaying means for displaying diving information obtained from the processing means, this method comprising:

- a step of displaying skin diving depth from the depth information,
- a step of displaying scuba diving depth from the time information after display of the skin diving depth,
- a step of making a judgment as to whether or not it is a decompression dive condition based on a priorly established diving time information and dive depth information after displaying the scuba diving depth,
- a step of, in a case in which it is not a decompression dive condition, making a judgment as to whether or not the current diver's diving depth exceeds a priorly established depth value,
- a step of, in a case in which the current diver's depth exceeds the priorly established depth value, displaying a safety stop graph indicating safety stop information using as a reference line, a prescribed depth value in one region of the display means in order to indicate safety stop information,
- a step of performing a judgment, after the safety stop graph is displayed, of whether or not the diver's current depth information is within a prescribed depth showing a priorly prescribed allowable range with respect to the reference line and, in a case in which the diver is within the allowable range, continuing the safety stop graph display, but if the diver is not within the allowable range, returning to the step that performs a judgment as to whether or not the diver's dive is a decompression dive,
- in the step of making judgment of whether or not the diver's dive is a decompression dive, a step of, in a case in which the diver's current dive depth is a priorly established decompression depth value, displaying on a part of area of the display means a decompression stop graph indicating decompression stop information using as a reference line a prescribed decompression depth value,
- a step of comparing the diver's current depth with a priorly established decompression instruction depth,
- a step of, after display of the decompression stop graph, making a judgment as to whether or not the current diver's depth information is within a depth range indicated as a priorly established prescribed allowable range with respect to the reference line,
- a step of, in a case in which the diver is within the allowable range, making a judgment as to whether or not the diver has elapsed the decompression instruction, and
- a step of, in a case in which the diver's dive time has passed the decompression instruction time, making a judgment as to whether the diver's dive is a decompression dive.

The present invention has a function for making a display of the depth during a safety stop at the time of decompression diving, and of automatically making a graphic display of a decompression stop depth display at the time of decompression. By providing not only a digital display but also a graphical display of the depth which must be maintained for a prescribed time, the present invention provides a display that is easy for the diver to understand.

What is claimed is:

1. A dive computer comprising:

at least timekeeping means for keeping a diving time;

measuring means for measuring diving information;

calculating means for processing diving information obtained from said measuring means; and display means for displaying diving information obtained from said calculating means;

wherein said display means minimally has a first function display for displaying a first function and a second function display for graphically displaying a second function including information selectively giving an instruction for a safety stop at a predefined depth when in a no-decompression dive, or a decompression stop at at least one predefined depth when in a decompression dive.

2. A dive computer according to claim 1, wherein said display means comprises a display region displaying, either simultaneously or separately, selective information related to said first function and information related to said second function.

3. A dive computer according to claim 2, wherein said display region arbitrarily selectively displays information related to said first function and information related to said second function.

4. A dive computer according to claim 2, wherein said display region is divided into a first region displaying information related to said first function and a second region displaying information related to said second function.

5. A dive computer according to any one of claim 1 to claim 4, wherein said second function display displays a reference line for said safety stop or said decompression stop.

6. A dive computer according to claim 5, wherein said second function display is configured so as to display a variation of a diving depth information of a diver from the past to now as a continuous solid line, dotted line, dot display, or bar graph in time sequence with respect to said reference line.

7. A dive computer according to claim 5, wherein when said second function display displays said reference line, and said reference line is displayed with an allowable line on at least one side thereof, said allowable line being in parallel with and at a prescribed distance from said reference line.

8. A dive computer according to claim 7, wherein said allowable line is displayed with a color differing from said reference line.

9. A dive computer according to claim 7, wherein in the case in which a diver's past and current depth exceeds a range between said reference line and at least one said allowable line, said graphic line is displayed with a color different from a normal graphic display.

10. A dive computer according to claim 5 wherein said calculating means compares a current depth with a prescribed depth and, if said safety stop is required, said display means is set to a safety stop graphical display mode.

11. A dive computer according to claim 10, wherein said display means, in a case in which said display means is in said safety stop graphical display mode, displays a graph showing the diver's current and past depths, including said reference line, and also digitally displays at least one information selected from the current diver depth information, dive time information, no-decompression time limit information, and how long said diver must stay at said safety stop depth.

12. A dive computer according to claim 5, wherein said calculating means compares a prescribed depth with a current depth and, if said decompression stop is required, said display means is set to a decompression stop graphical display mode.

13. A dive computer according to claim 12, wherein said display means, in a case in which said display means is in said decompression stop graphic display mode, displays a graph showing the diver's current and past depths, including said reference line, and also digitally displays at least one information selected from the current diver depth information, dive time information, decompression stop depth information, and information regarding how long said diver must stay at said decompression stop depth.

14. A dive computer according to claim 1, wherein said first function display includes a display of a current depth of a diver.

15. A method for operating a dive computer including timekeeping means for keeping the dive time, measuring means for measuring diving information, calculating means for processing diving information obtained from said measuring means, and displaying means for displaying diving information obtained from the calculating means, said method comprising:

a step of displaying skin diving depth from said depth information, a step of displaying scuba diving depth from said time information after display of the skin diving depth, a step of making a judgment as to whether or not it is a decompression dive condition based on priorly established diving time information and dive depth information after displaying said scuba diving depth, a step of, in a case in which it is not a decompression dive condition, making a judgment as to whether or not said current diver's diving depth exceeds a priorly established depth value, a step of, in a case in which said current diver's depth exceeds the priorly established depth value, displaying a safety stop graph indicating safety stop information using as a reference line, a prescribed depth value in one region of said display means in order to indicate safety stop information, a step of performing a judgment, after said safety stop graph is displayed, of whether or not said diver's current depth information is within a prescribed depth showing a priorly prescribed allowable range with respect to said reference line and, in a case in which said diver is within said allowable range, continuing said safety stop graph display, but if said diver is not within said allowable range, returning to said step that performs a judgment as to whether or not said diver's dive is a decompression dive, in said step of making judgment of whether or not said diver's dive is a decompression dive, a step of, in a case in which said diver's current dive depth is a priorly established decompression depth value, displaying on a part of area of said display means a decompression stop graph indicating decompression stop information using as a reference line a prescribed decompression depth value, a step of comparing said diver's current depth with a priorly established decompression instruction depth, a step of, after display of said decompression stop graph, making a judgment as to whether or not said current diver's depth information is within a depth range indicated as a priorly established prescribed allowable range with respect to said reference line, a step of, in a case in which the diver is within said allowable range, making a judgment as to whether or not said diver has elapsed said decompression instruction, and a step of, in a case in which said diver's dive time has passed said decompression instruction time, making a judgment as to whether said diver's dive is a decompression dive.

16. A computer program executing a method for operating a dive computer including timekeeping means for keeping the dive time, measuring means for measuring diving information, calculating means for processing diving information obtained from said measuring means, and displaying means for displaying diving information obtained from the calculating means, said computer program comprising:

a step of displaying skin diving depth from said depth information, a step of displaying scuba diving depth from said time information after display of the skin diving depth, a step of making a judgment as to whether or not it is a decompression dive condition based on a priorly established diving time information and dive depth information after displaying said scuba diving depth, a step of, in a case in which it is not a decompression dive condition, making a judgment as to whether or not said current diver's diving depth exceeds a priorly established depth value, a step of, in a case in which said current diver's depth exceeds the priorly established depth value, displaying a safety stop graph indicating safety stop information using as a reference line, a prescribed depth value in one region of said display means in order to indicate safety stop information, a step of performing a judgment, after said safety stop graph is displayed, of whether or not said diver's current depth information is within a prescribed depth showing a priorly prescribed allowable range with respect to said reference line and, in a case in which said diver is within said allowable range, continuing said safety stop graph display, but if said diver is not within said allowable range, returning to said step that performs a judgment as to whether or not said diver's dive is a decompression dive, in said step of making judgment of whether or not said diver's dive is a decompression dive, a step of, in a case in which said diver's current dive depth is a priorly established decompression depth value, displaying on a part of area of said display means a decompression stop graph indicating decompression stop information using as a reference line a prescribed decompression depth value, a step of comparing said diver's current depth with a priorly established decompression instruction depth, a step of, after display of said decompression stop graph, making a judgment as to whether or not said current diver's depth information is within a depth range indicated as a priorly established prescribed allowable range with respect to said reference line, a step of, in a case in which the diver is within said allowable range, making a judgment as to whether or not said diver has elapsed said decompression instruction, and a step of, in a case in which said diver's dive time has passed said decompression instruction time, making a judgment as to whether said diver's dive is a decompression dive.

* * * * *

UNITED STATES PATENT AND TRADEMARK OFFICE
CERTIFICATE OF CORRECTION

PATENT NO. : 6,904,382 B2  
DATED : June 7, 2005  
INVENTOR(S) : Yukimi Hayafune It is certified that error appears in the above-identified patent and that said Letters Patent is hereby corrected as shown below:

Column 3,  
Line 64, delete "refereed" and insert -- referred --.

Signed and Sealed this

Fourth Day of October, 2005

JON W. DUDAS  
*Director of the United States Patent and Trademark Office*